(12) United States Patent
Sterlepper et al.

(10) Patent No.: US 11,352,932 B2
(45) Date of Patent: *Jun. 7, 2022

(54) METHOD OF AGEING A COMPONENT OF AN EXHAUST AFTER TREATMENT SYSTEM

(71) Applicant: FEV Europe GmbH, Aachen (DE)

(72) Inventors: Stefan Sterlepper, Eschweiler (DE); Michael Görgen, Cologne (DE); Jimmy Cox, Kerkrade (NL)

(73) Assignee: FEV Europe GmbH, Aachen (DE)

( * ) Notice: Subject to any disclaimer, the term of this patent is extended or adjusted under 35 U.S.C. 154(b) by 159 days.

This patent is subject to a terminal disclaimer.

(21) Appl. No.: 16/211,823

(22) Filed: Dec. 6, 2018

(65) Prior Publication Data

US 2019/0178143 A1  Jun. 13, 2019

(30) Foreign Application Priority Data

Dec. 7, 2017 (DE) .................... 102017129171.7

(51) Int. Cl.
| | |
|---|---|
| *F01N 11/00* | (2006.01) |
| *F01N 3/10* | (2006.01) |
| *F01N 3/035* | (2006.01) |
| *G01M 15/10* | (2006.01) |
| *G01M 15/04* | (2006.01) |

(52) U.S. Cl.
CPC ............. *F01N 11/00* (2013.01); *F01N 3/035* (2013.01); *F01N 3/101* (2013.01); *G01M 15/102* (2013.01); *F01N 2550/02* (2013.01); *F01N 2550/04* (2013.01); *F01N 2550/20* (2013.01); *G01M 15/04* (2013.01); *Y02T 10/12* (2013.01); *Y02T 10/40* (2013.01)

(58) Field of Classification Search
CPC .......... F01N 11/00; F01N 3/101; F01N 3/035; F01N 2550/02; F01N 2550/04; F01N 2550/20; G01M 15/102; G01M 15/04; Y02T 10/12; Y02T 10/40

See application file for complete search history.

(56) References Cited

U.S. PATENT DOCUMENTS

| | | | | |
|---|---|---|---|---|
| 6,983,645 | B2 * | 1/2006 | Webb .................... | F23D 11/104 73/118.01 |
| 7,131,320 | B2 * | 11/2006 | Weinowski ............ | F01N 11/00 73/114.75 |
| 7,140,874 | B2 * | 11/2006 | Ingalls, Jr. ............ | F01N 3/2033 431/185 |
| 7,175,422 | B2 * | 2/2007 | Webb .................... | F01N 3/2033 431/2 |
| 7,212,926 | B2 * | 5/2007 | Ingalls, Jr. ............. | F01N 11/00 702/34 |
| 7,277,801 | B2 * | 10/2007 | Webb .................... | F01N 3/2033 702/34 |
| 7,347,086 | B2 * | 3/2008 | Webb .................... | F23D 11/107 73/29.01 |
| 7,625,201 | B2 * | 12/2009 | Ingalls, Jr. ............ | F23D 11/103 431/18 |
| 7,741,127 | B2 * | 6/2010 | Johnston Bartley .... | F01N 3/021 436/181 |
| 7,975,538 | B2 * | 7/2011 | In ........................ | G01M 15/102 73/114.75 |
| 8,495,908 | B2 * | 7/2013 | Nagy .................... | G01M 15/02 73/114.13 |
| 8,679,852 | B2 * | 3/2014 | Webb ..................... | G01N 1/28 436/160 |
| 2004/0007056 | A1 * | 1/2004 | Webb ..................... | F23C 7/004 73/114.77 |
| 2004/0025580 | A1 * | 2/2004 | Webb ..................... | F01N 11/00 73/118.01 |
| 2004/0028588 | A1 * | 2/2004 | Webb ..................... | F01N 3/025 423/213.2 |
| 2005/0039524 | A1 * | 2/2005 | Ingalls, Jr. ............. | F01N 11/00 73/114.77 |
| 2006/0201239 | A1 * | 9/2006 | Webb .................... | F23D 11/103 73/114.75 |
| 2009/0151336 | A1 * | 6/2009 | In ........................ | G01M 15/102 60/289 |
| 2011/0183274 | A1 * | 7/2011 | Bahn ..................... | F01N 3/2033 431/2 |
| 2019/0234279 | A1 * | 8/2019 | Sterlepper ............... | F01N 3/025 |

FOREIGN PATENT DOCUMENTS

| | | |
|---|---|---|
| DE | 112008001335 T5 | 6/2010 |
| DE | 102016103735 A1 | 9/2017 |
| WO | 2010022747 A1 | 3/2010 |

OTHER PUBLICATIONS

German Search Report dated Jul. 24, 2018; German Application No. 10 2017 129 171.7.

* cited by examiner

*Primary Examiner* — Freddie Kirkland, III
(74) *Attorney, Agent, or Firm* — Dinsmore & Shohl LLP

(57) ABSTRACT

A method of ageing a component of an exhaust gas aftertreatment system including the steps of combusting fuel to subject the component to a continuous thermal ageing and simultaneously target loading at least certain sections of the component with ash. The method can be used on a test bench.

12 Claims, No Drawings

METHOD OF AGEING A COMPONENT OF AN EXHAUST AFTER TREATMENT SYSTEM

CROSS-REFERENCE TO RELATED APPLICATIONS

This Application claims priority from Application 102017129171.7 filed on Dec. 7, 2017 in Germany.

FIELD OF THE INVENTION

The invention relates to a method for ageing a component of an exhaust gas after-treatment system and to a test bench for ageing one or more components of an exhaust gas after-treatment system.

BACKGROUND OF THE INVENTION

WO2010/022747 discloses a method and a test bench for ageing a component of an exhaust gas after-treatment system.

SUMMARY OF THE INVENTION

The method according to the invention for ageing a component of an exhaust gas after-treatment system provides that the component is subjected to a continuous thermal ageing process by means of combustion of a fuel, and at the same time targeted loading of the component with ash takes place at least in certain sections.

This permits both thermal ageing and loading with ash to be carried out for the component in a time-saving fashion under advantageous conditions which are close to reality. Furthermore, with the method it is possible to avoid undefined thermal damage as a result of separate loading with ash. It is preferred that the loading of the component with ash takes place essentially completely within the time period of the continuous thermal ageing. The invention includes the ageing of an entire exhaust gas after-treatment system or of part thereof.

DETAILED DESCRIPTION OF THE PREFERRED EMBODIMENTS

The term "targeted" means that loading of the components with ash does not occur as a "random" product but rather that the loading of the component with ash is a result of the method which is desired by predefining conditions. It is preferred that targeted loading is predefined and the loading with ash takes place in accordance with the targeted loading. Alternatively it is possible to predefine what quantity of ash is fed in over a specific time period (constantly or in a variable fashion).

The continuous ageing preferably takes place in accordance with an ageing cycle which is defined in advance, for example according to the Standard Bench Cycle (SBC) or the ZDAKW.

The exhaust gas after-treatment component can be provided both for a spark-ignition fuel or for a diesel fuel. The fuel which is burnt is selected accordingly. The possibility of ageing a plurality of components jointly is also included.

Furthermore it is preferred that, for the purpose of making available the ash, an ash former is fed to the non-burnt fuel, an ash former is also burnt in the burner which is provided for the combustion of the fuel, or ash is fed to the exhaust gas which is produced by burning the fuel. The first variant has the advantage that there is no need to provide separate means for introducing or generating ash. The second variant has the advantage that the burner which is provided for the fuel can also be used to generate the ash. The third variant has the advantage that the ash can be generated separately. The two last variants also permit the loading with ash to be able to be controlled variably independently of the fuel, which is advantageous for reaching a desired loading.

Suitable ash formers are, for example, oil or additives. As ash former is used which corresponds to the actual conditions at the vehicle, for example engine oil.

The test bench according to the invention for ageing one or more components of an exhaust gas after-treatment system is correspondingly configured to carry out the method according to the invention.

The dependent claims describe further advantageous embodiments of the invention.

A preferred exemplary embodiment of the invention and possible variants are described in the text which follows.

According to the method for ageing a component of an exhaust gas after-treatment system, the component is subjected to a continuous thermal ageing process by means of combustion of a fuel. At the same time, targeted loading of the component with ash takes place at least in certain sections.

Firstly, a suitably configured engine test bench or burner test bench is started and the desired operating point at which the ageing is to be started is set. The ageing takes place in accordance with a predefined ageing cycle, for example with an SBC or ZDAKW cycle for thermal ageing. This can involve, for example, a fixed ageing time or an iterative ageing time calculation. Customary thermal ageing periods are approximately 100 h for ZDAKW, 50 to 1000 h for SBC, or 10 to 100 h for limit catalysts.

The loading of the component with ash takes place at the same time as the thermal ageing. In this exemplary embodiment, the loading starts and ends essentially simultaneously with the thermal ageing. Furthermore, the loading takes place continuously with the burning of fuel. An advantage of this procedure is that it models the real conditions at the vehicle well, with the formation of ash being related to the fuel consumption and/or the operation of the engine. Alternatively it is possible to start or to end the loading beforehand or later. Discontinuous operation is also possible, i.e. loading takes place without the fuel being burnt, or fuel is burnt without loading taking place, for example in order to model particular situations.

For the purpose of making available the ash, an ash former is fed to the non-burnt fuel. This can be done by adding oil or additives to the fuel. In this case, ash is generated continuously with the starting of the test bench by burning the fuel. Alternatively, an ash former (preferably engine oil which corresponds to the target vehicle; alternatively, for example, a solution of additives) can be fed separately to the burner and burnt jointly with the fuel. In this case it is preferred not to start the ash production until the thermal ageing starts, in order to prevent partial loading of the component with ash in advance. A further possibility is to generate ash-containing exhaust gas separately, e.g. by means of an oil burner, and to add it to the exhaust gas. The loading of the component with ash takes place at the same time as the thermal ageing. In this exemplary embodiment, the loading starts and ends essentially simultaneously with the thermal ageing. Furthermore, the loading takes place continuously with the burning of fuel. An advantage of this procedure is that it models the real conditions at the vehicle well, with the formation of ash being related to the fuel consumption and/or the operation of the engine. Alternatively it is possible to start or to end the loading beforehand or later. Discontinuous operation is also possible, i.e. loading takes place without the fuel being burnt, or fuel is burnt without loading taking place, for example in order to model particular situations.

The loading of the component with ash takes place at the same time as the thermal ageing. In this exemplary embodiment, the loading starts and ends essentially simultaneously with the thermal ageing. Furthermore, the loading takes place continuously with the burning of fuel. An advantage of this procedure is that it models the real conditions at the vehicle well, with the formation of ash being related to the fuel consumption and/or the operation of the engine. Alternatively it is possible to start or to end the loading beforehand or later. Discontinuous operation is also possible, i.e. loading takes place without the fuel being burnt, or fuel is burnt without loading taking place, for example in order to model particular situations.

The loading of the component with ash takes place at the same time as the thermal ageing. In this exemplary embodiment, the loading starts and ends essentially simultaneously with the thermal ageing. Furthermore, the loading takes place continuously with the burning of fuel. An advantage of this procedure is that it models the real conditions at the vehicle well, with the formation of ash being related to the fuel consumption and/or the operation of the engine. Alternatively it is possible to start or to end the loading beforehand or later. Discontinuous operation is also possible, i.e. loading takes place without the fuel being burnt, or fuel is burnt without loading taking place, for example in order to model particular situations.

There are various possible ways of loading the components in a targeted manner with ash. In this exemplary embodiment, targeted loading is predefined and the loading with ash takes place in accordance with the targeted loading to be achieved. For this purpose, a loading duration over which the ash has to be fed in can be determined from the consumption of the ash former and a known loading rate. Alternatively it is possible to predefine a consumption of the ash former over an ageing time for the loading with ash.

The fed-in quantity of the ash former is preferably set, for example by means of the mass flow or volume flow, in such a way that simultaneous ending with the thermal ageing is achieved. In this exemplary embodiment the duration of the loading is made equivalent to the thermal ageing. Alternatively, the loading with ash can take place discontinuously. In this case, it should advantageously also take place within the duration of the thermal ageing.

In this exemplary embodiment, the thermal ageing takes place mainly at a temperature of at least 750° C. The component is subjected to various temperature gradients and/or oxygen gradients during the method. The gradients and the time sequence of the gradients are tailored to the Standard Bench Cycle (SBC). This mainly means here that the temperature is at least 750° C. for at least 50% of the time during the continuous thermal ageing and/or for the loading with ash. Such temperatures permit accelerated ageing of the component.

A duration for the loading with ash and a duration for the continuous thermal ageing are approximately identical in this exemplary embodiment.

The duration for the loading with ash and the duration for the continuous thermal loading are 50-1000 h according to the SBC. The durations are approximately identical when they differ from one another by less than 20%. This permits the continuous thermal ageing and the loading with ash to be able to take place approximately chronologically, with the result that the overall duration for the execution of the method according to the invention is advantageously reduced.

In one variant, the loading with ash at the test bench is implemented with a regulating device which regulates the loading of the component by controlling the quantity of fed-in ash former on the basis of a target variable.

During the method, the actual loading of the component with ash is determined, compared with an assumed loading, and the loading with ash is adapted on the basis of the result of the comparison. This can be done, for example, after 50% of the ageing time. In this case, the component is a particle filter. The ageing is interrupted and the particle filter is weighed and compared with the assumed loading. The data is used to fine-adjust the loading with ash during the further ageing, with the result that a simultaneous end occurs. On the basis of the magnitude of the necessary correction it is discerned whether further comparisons are appropriate. In one variant, the component is a four-way catalytic converter which has an integrated particle filter, and the fuel is a spark-ignition fuel. Interruption and weighing for the purpose of re-adjustment also take place here. In a further variant, the component is a three-way catalytic converter.

The method can be used for all components of exhaust gas after-treatment systems which are subject to thermal ageing, for example three-way catalytic converters, SCR, $NO_x$ storage-type catalytic converters, diesel oxidation catalytic converters as well diesel particle filters or spark-ignition particle filters. It is also possible to age multiple components simultaneously and load them with ash.

The invention claimed is:

1. A method for ageing a component of an exhaust gas after-treatment system, comprising the steps of:
   subjecting a component to a continuous thermal ageing process by combustion of a fuel in a burner, and targeted loading of at least certain sections of the component with ash at the same time;
   wherein an ash forming component is feed to non-burnt fuel.

2. The method according to claim 1, wherein the continuous thermal ageing takes place at a temperature of at least 750° C.

3. The method of claim 1, wherein the loading with ash takes place continuously or discontinuously.

4. The method of claim 1, wherein the targeted loading is predefined and the loading with ash is carried out in accordance with the targeted loading to be achieved.

5. The method according to claim 1, wherein for the loading with ash, consumption of the ash former is predefined over an ageing time.

6. The method of claim 1, wherein a duration for the loading with ash and a duration for the continuous thermal ageing are virtually identical.

7. The method of claim 1, wherein during the method the actual loading of the component with ash is determined, is compared with an assumed loading, and the loading with ash is adapted on the basis of the result of the comparison.

8. The method of claim 1, wherein the component is a particle filter or a three-way or four-way catalytic converter.

9. The method of claim 1, wherein the fuel is a spark-ignition fuel or a diesel fuel.

10. The method of claim 1 further comprising test benching for ageing one or more components of an exhaust gas after-treatment system.

11. A method for ageing a component of an exhaust gas after-treatment system, comprising the steps of:

subjecting a component to a continuous thermal ageing process by combustion of a fuel in a burner, and targeted loading of at least certain sections of the component with ash at the same time;

wherein an ash forming component is feed into the burner separately.

12. A method for ageing a component of an exhaust gas after-treatment system, comprising the steps of:

subjecting a component to a continuous thermal ageing process by combustion of a fuel in a burner, and targeted loading of at least certain sections of the component with ash at the same time;

wherein ash separately generated from combustion of the fuel in the burner is fed to the component downstream of the burner.

* * * * *